(12) United States Patent
Friedrich et al.

(10) Patent No.: US 11,153,375 B2
(45) Date of Patent: Oct. 19, 2021

(54) USING REINFORCEMENT LEARNING TO SCALE QUEUE-BASED SERVICES

(71) Applicant: Adobe Inc., San Jose, CA (US)

(72) Inventors: Michael Friedrich, Hamburg (DE); Stefanie Grunwald, Hamburg (DE)

(73) Assignee: Adobe Inc., San Jose, CA (US)

( * ) Notice: Subject to any disclaimer, the term of this patent is extended or adjusted under 35 U.S.C. 154(b) by 65 days.

(21) Appl. No.: 16/587,906

(22) Filed: Sep. 30, 2019

(65) Prior Publication Data

US 2021/0099517 A1    Apr. 1, 2021

(51) Int. Cl.
*H04L 29/08*    (2006.01)
*G06N 20/00*    (2019.01)

(52) U.S. Cl.
CPC ......... *H04L 67/1031* (2013.01); *G06N 20/00* (2019.01); *H04L 67/1029* (2013.01)

(58) Field of Classification Search
CPC ............. H04L 67/1008; H04L 67/1029; H04L 67/1031; H04L 29/08; G06N 20/00; G06N 3/006; G06F 11/3433; G06F 16/20
USPC ........................................................ 709/224
See application file for complete search history.

(56) References Cited

U.S. PATENT DOCUMENTS

| | | | |
|---|---|---|---|
| 9,141,435 B2* | 9/2015 | Wein ..................... | G06F 9/5061 |
| 9,386,086 B2* | 7/2016 | Fenoglio ................. | G06F 9/505 |
| 10,402,733 B1* | 9/2019 | Li ........................... | G06N 7/005 |
| 10,503,553 B1* | 12/2019 | Ashok ................... | G06F 11/3433 |
| 2007/0203871 A1* | 8/2007 | Tesauro ................. | G06N 3/006 |
| | | | 706/53 |
| 2009/0099985 A1* | 4/2009 | Tesauro .................... | G06N 5/02 |
| | | | 706/12 |
| 2010/0241743 A1* | 9/2010 | Perira ................. | H04L 67/1002 |
| | | | 709/224 |
| 2014/0180978 A1* | 6/2014 | Martinez .............. | G06N 3/0454 |
| | | | 706/12 |
| 2015/0304176 A1* | 10/2015 | Ting ................... | G06Q 30/0283 |
| | | | 709/203 |

(Continued)

OTHER PUBLICATIONS

Koch, William, et al, "Neuroflight: Next Generation Flight Control Firmware", https://wfk.io/neuroflight/, Jan. 2019, 7 pages.

(Continued)

*Primary Examiner* — James N Fiorillo
(74) *Attorney, Agent, or Firm* — Kilpatrick Townsend & Stockton LLP

(57) ABSTRACT

Techniques for adjusting a compute capacity of a cloud computing system. In an example, a compute scaling application accesses, from a cloud computing system, a compute capacity indicating a number of allocated compute instances of a cloud computing system and usage metrics indicating pending task requests in a queue of the cloud computing system. The compute scaling application determines, for the cloud computing system, a compute scaling adjustment by applying a machine learning model to the compute capability of the cloud computing system and the usage metrics. The compute scaling adjustment indicates an adjustment to a number of compute instances of the cloud computing system. The compute scaling application provides the compute scaling adjustment to the cloud computing system. The cloud computing system adjusts a number of allocated compute instances.

16 Claims, 8 Drawing Sheets

(56) References Cited

U.S. PATENT DOCUMENTS

| | | | | |
|---|---|---|---|---|
| 2017/0242774 A1* | 8/2017 | Gopu | ................ | G06F 11/3409 |
| 2018/0227165 A1* | 8/2018 | Philip | .................... | H04L 47/70 |
| 2018/0293463 A1* | 10/2018 | Brown | ................ | G06F 9/4881 |
| 2018/0357047 A1* | 12/2018 | Brown | .................... | G06N 3/08 |
| 2019/0098080 A1* | 3/2019 | Bermudez | .......... | H04L 63/1458 |
| 2019/0098081 A1* | 3/2019 | Rutkowski | .......... | H04L 67/1008 |
| 2019/0342184 A1* | 11/2019 | May | ........................ | G06N 5/04 |
| 2020/0004582 A1* | 1/2020 | Fornash | ............. | H04L 67/1008 |
| 2020/0167687 A1* | 5/2020 | Genc | ...................... | G06N 3/006 |
| 2020/0174842 A1* | 6/2020 | Wang | ................... | G06F 9/5072 |
| 2020/0244770 A1* | 7/2020 | Cooley | .............. | H04L 41/0806 |
| 2021/0019194 A1* | 1/2021 | Bahl | ...................... | G06N 20/00 |

OTHER PUBLICATIONS

Chen, Li, et al., "AuTO: Scaling Deep Reinforcement Learning for Datacenter-Scale Automatic Traffic Optimization", SIGCOMM '18 Proceedins of the 2018 Conference of the ACM Special Interest Group on Data Communication, Aug. 2018, 15 pages.

Arabjejad, Hamid, et al., "A Comparison of Reinforcement Learning Techniques for Fuzzy Cloud Auto-Scaling", arXiv 1705. 07114v1, May 2017, 11 pages.

Barr, Jeff, "New—Predictive Scaling or EC2, Powered by Machine Learning", Amazon EC2, Auto Scaling, awS Re:Invent, Launch, News. Nov. 2018, https://aws.amazon com/blogs/aws/new-predictive-scaling-for-ec2-powered-by-machine-learning/ , 12 pages.

* cited by examiner

USING REINFORCEMENT LEARNING TO SCALE QUEUE-BASED SERVICES

TECHNICAL FIELD

This disclosure relates to queue-based computing services. More specifically, but not by way of limitation, this disclosure involves using reinforcement learning to adjust a capacity of a queue-based computing service in real-time.

BACKGROUND

Computing systems have become more complex, and the demands on the resources of such systems have increased. For many service providers, continuously updating computing systems to keep up with their evolving services is not feasible. Consequently, many service providers use cloud computing systems to leverage additional computing resources to assist with providing services.

A cloud computing service system may scale a number of the allocated processors or computing resources up or down to reflect current demands. But existing solutions for scaling cloud-based services require manual adjustment of parameters, especially when considering different types of processing requests (e.g., applying a filter to an image versus rendering a three-dimensional object). Therefore, existing techniques may involve disadvantages for reasons such as (but not limited to) those described above.

SUMMARY

Techniques are disclosed herein for adjusting a number of compute instances of a cloud computing system. In an example, a compute scaling application accesses, from a cloud computing system, a compute capacity indicating a number of allocated compute instances of a cloud computing system and usage metrics indicating pending task requests in a queue of the cloud computing system. The compute scaling application determines, for the cloud computing system, a compute scaling adjustment by applying a machine learning model to the compute capability of the cloud computing system and the usage metrics. The compute scaling adjustment indicates an adjustment to a number of compute instances of the cloud computing system. The compute scaling application provides the compute scaling adjustment to the cloud computing system. The cloud computing system adjusts a number of allocated compute instances.

In another example, an application facilitates learning of a machine learning model. The application accesses historical data that includes, for a point in time, a number of a compute capacity and usage metrics. The application determines a compute scaling adjustment for a cloud computing model by applying a machine learning model to the number of a compute capacity and the usage metrics. The compute scaling adjustment indicates an adjustment to the number of compute instances. The application modifies the number of compute instances of the cloud computing model according to the compute scaling adjustment. The application computes a reward value as a function of an overage of the modified number of compute instances relative to a maximum number of compute instances, a number of pending processing requests in the queue, and a weighted sum of the modified number of compute instances relative to the current load. The application provides the reward value to the machine learning model. The machine learning model adjusts one or more internal parameters to maximize a cumulative reward. Responsive to determining that the cumulative reward is above a threshold, the application provides the machine learning model to a cloud compute scaling system.

In another example, an application determines, for a cloud computing system having a number of compute instances, a compute scaling adjustment by applying a machine learning model to a compute capacity indicating a number of allocated compute instances and usage metrics indicating pending any processing requests in a queue of the cloud computing system. The compute scaling adjustment indicates an adjustment to the number of compute instances. The application modifies the machine learning model and a number of compute instances of the cloud computing system. Modifying the machine learning model includes computing a first reward value and adjusting an internal parameter of the machine learning model. The adjusting causes a second reward value to be computed from a subsequent compute scaling adjustment. Modifying the number of compute instances of the cloud computing system includes providing the compute scaling adjustment to the cloud computing system. The cloud computing system allocates or deallocates more compute instances.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
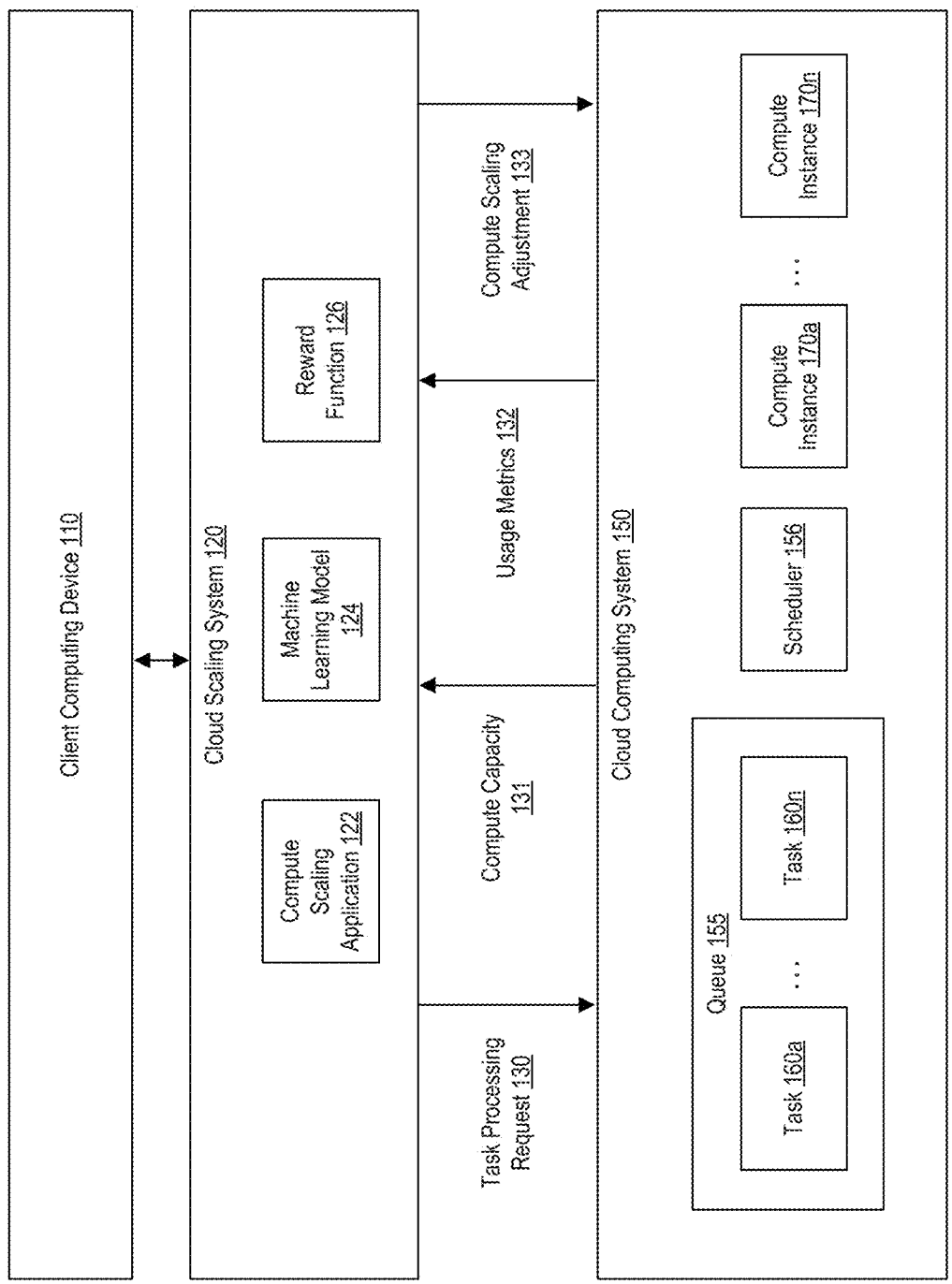
FIG. 1 is a diagram depicting an example of a cloud computing environment, according to an embodiment of the present disclosure.

Leveraging computing resources of a cloud computing system for asynchronous processing can involve allocating of computing resources on an as-needed basis. But as discussed, existing cloud computing systems may require adjustment of parameters when conditions change, for example if a pending number of computing tasks increases above a threshold level. Such adjustments are cumbersome. Moreover, existing systems cannot easily adjust computing resources based on differing requirements for different types of computing tasks. For example, one computing task may take longer to execute than another task or have a stricter latency requirement.

In contrast, embodiments of the present disclosure can automatically determine an appropriate compute scaling adjustment that can be applied to a cloud computing system to increase or decrease a number of allocated compute instances as appropriate as computing needs change. Examples of compute instances include, but are not limited to, predefined amounts of resources such as processor time or disk usage, virtual machines, logical processor entities, and hardware processors. This approach more efficiently uses computing resources than existing solutions, by automatically adjusting to different types of computing tasks and load fluctuations such as seasonal or daily load fluctuations.

The following non-limiting example is introduced for discussion purposes. A cloud scaling system monitors current computing needs versus available resources by using a machine learning model. The compute scaling system applies the machine learning model to a compute capacity of the cloud computing system (e.g., how many compute instances are currently allocated and how many compute instances are available for allocation) and usage metrics (e.g., a number of pending processing requests in a queue or a number of incoming tasks) to determine the compute scaling adjustment. The compute scaling adjustment is provided to a cloud computing system, which increases, decreases, or maintains a number of compute instances.

Some embodiments use reinforcement learning. Reinforcement learning involves motivating a machine learning model to learn to take certain actions within an environment by maximizing a cumulative reward. The reward is determined by evaluating a reward function at different iterations or points in time. For instance, the machine learning model used by the cloud scaling system computes a reward based on a performance of the cloud computing system after implementation of the compute scaling adjustment. In contrast to existing solutions that rely on learning historic compute patterns, using reinforcement learning enables certain embodiments to learn how to make adjustments to compute instances as parameters (e.g., queue size, pending jobs) change.

In one example, the reward function includes a sum of three components. The first component is a function of any overage or underage of computing capacity subsequent to the determined adjustment in compute instances. The first component adjusts the calculated reward downward if a compute scaling adjustment would cause the allocated number of compute instances in a cloud computing system to increase above a maximum number of compute instances or fall below a minimum number of compute instances. The second component is computed from a number of tasks in the queue. The second component sharply decreases the outputted reward as the number of tasks in the queue increases. The third component is computed from a number of allocated compute instances as compared to a current load, where the current load is a proportion of the allocated compute instances that are being used by any incoming processing requests and the tasks in the queue. The third component indicates to the machine learning model that reducing the number of compute instances when the computing load is high is less desirable than during times when the computing load is low. Computing a reward from these terms can reduce unnecessary increases in number of allocated compute instances while ensuring sufficient capacity exists in the cloud computing system.

Turning now to the Figures, FIG. 1 is a diagram depicting an example of a cloud scaling system that can adjust a number of allocated compute instances of a cloud computing system, according to an embodiment of the present disclosure. FIG. 1 depicts computing environment 100 having a client computing device 110, a cloud scaling system 120, and a cloud computing system 150. Client computing device 110, cloud scaling system 120, and cloud computing system 150 are connected via a network, which can be a wired network or a wireless network.

In the example provided by FIG. 1, cloud scaling system 120 accesses compute capacity 131 and usage metrics 132 from cloud computing system 150 to determine a compute scaling adjustment 133. The compute scaling adjustment 133 causes cloud computing system 150 to increase or decrease a number of compute instances 170*a-n* that are allocated to process computing tasks such as tasks generated by client computing device 110. In this manner, unneeded resources are not allocated while sufficient resources are deployed in the event of a surge in demand, for example, an increased load in the morning.

Client computing device 110 can perform any computing functions. Examples of computing functions include image processing, document processing, and web browsing. In the process of performing these functions, client computing device 110 can also send a request for a computing task to be performed to cloud computing system 150. In turn, the cloud computing system 150 inserts the request (or message) into queue 155. The queue 155 includes a set of tasks 160*a-n*. Scheduler 156 allocates tasks 160*a-n* from queue 155 to one or more of the compute instances 170*a-n*. Scheduler 156 can use different approaches to determine an order in which a particular task is processed, e.g., round robin, first in first out, priority based, etc. Compute instances 170*a-n* can be virtual (e.g., a virtual machine or a maximum proportion of resources such as processor cycles), logical (e.g., a logical core of a processor), or physical (e.g., a processor core or a computing system). For illustrative purposes, FIG. 1 includes an example with n tasks and n compute instances, but the number of tasks in the queue 155 may differ from the number of compute instances of the cloud computing system 150.

Cloud scaling system 120 can include one or more processing devices that execute program code and thereby determine changes in compute capacity that should be implemented by the cloud computing system 150. Examples of the program code executed by the cloud scaling system 120 include cloud scaling application 122, machine learning model 124, and reward function 126. Cloud scaling application 122 generates a compute scaling adjustment 133 by applying machine learning model 124 to various inputs. Examples of these inputs include compute capacity 131 and usage metrics 132.

In some cases, cloud scaling system 120 can be integrated with the cloud computing system 150. Client computing device 110 can pass processing requests directly to cloud computing system 150. In some cases, cloud scaling system 120 can relay one or more processing requests 130 from a client computing device to cloud computing system 150.

Cloud scaling system 120 provides the compute scaling adjustment 133 to cloud computing system 150. The cloud computing system 150 uses the received compute scaling adjustment 133 to modify the number of allocated compute instances 170*a-n*.

The compute capacity 131 can include one or more of a maximum of available compute instances 170*a-n* (e.g., that could be allocated), and a load. The load is an average of the allocated compute instances 170*a-n* of compute capacity that is being used. For example, if compute instances 170*a-b* are allocated, and compute instance 170*a* is used at 40% and compute instance 170*b* at 60%, then the compute capacity 131 is 50%. The usage metrics 132 can include: a number of task requests in queue 155, a number of task requests in the queue 155 that are currently processed, or a rate at which new tasks are currently arriving.

The compute scaling adjustment 133, which is calculated by the cloud scaling system 120, is a number of compute instances 170*a-n* to allocate or deallocate. For example, a compute scaling adjustment 133 of +2 signifies that the number of compute instances 170*a-n* should be increased by two. An example of determining the compute scaling adjustment 133 is provided herein with respect to FIG. 2.

The machine learning model 124 can be any suitable machine-learning model that is configured to receive compute capacity 131 and usage metrics 132 as inputs and determine a corresponding compute scaling adjustment 133. Examples of suitable machine learning models include models that can be used with reinforcement learning. Examples of suitable algorithms for use with the model include Proximal Policy Optimization (PPO), Deep Q learning (DQN), Trust Region Policy Optimization (TRPO), and Deep Determininistic Policy Gradient (DDPG) algorithms.

The machine learning model 124 can be configured via a learning process. In the learning process, one or more parameters of the machine learning model 124 are modified in accordance with feedback from the reward function 126. Examples of determining the compute scaling adjustment 133 and using the reward function 126 to modify the machine learning model 124 are provided herein with respect to FIG. 3.

Figure 2:
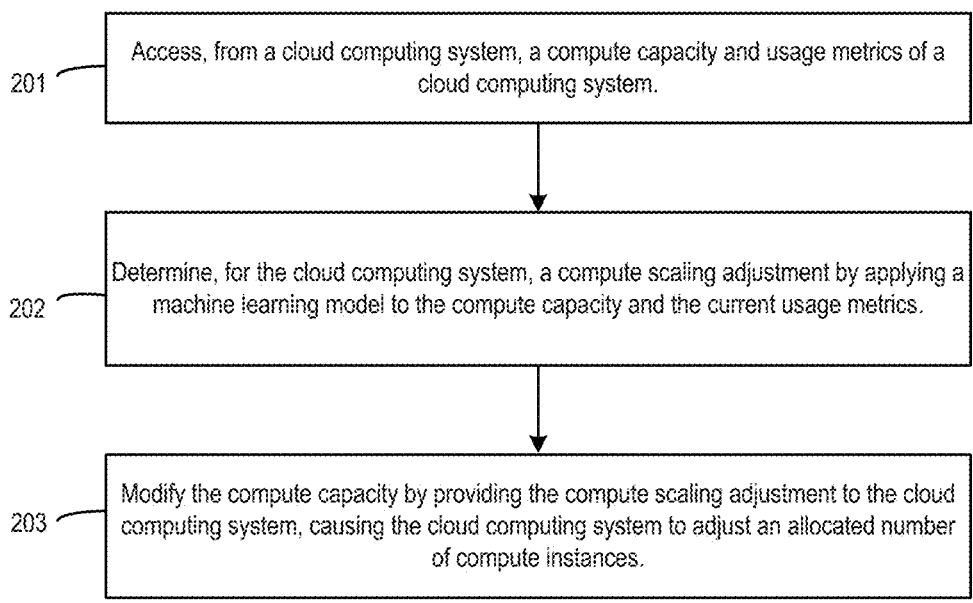
FIG. 2 is a flow chart depicting an example of a process for adjusting a number of allocated compute instances of a cloud computing system, according to an embodiment of the present disclosure.

FIG. 2 is a flow chart depicting an example of a process for adjusting a number of allocated compute instances of a cloud computing system, according to an embodiment of the present disclosure. Process 200 can be implemented by cloud scaling application 122 and/or an application executing on cloud computing system 150. In some cases, only some of the operations described in process 200 are performed.

At block 201, process 200 involves accessing, from a cloud computing system, a compute capacity and usage metrics. For example, cloud scaling application 122 accesses compute capacity 131 and usage metrics 132 from cloud computing system.

At block 202, process 200 involves determining, for the cloud computing system, a compute scaling adjustment by applying a machine learning model to the compute capacity and the usage metrics. The compute scaling adjustment 133 indicates an adjustment to a number of allocated compute instances 170*a-n* of the cloud computing system.

Continuing the example, cloud scaling application 122 provides compute capacity 131 and usage metrics 132 to machine learning model 124. The usage metrics 132 can indicate pending task requests in a queue of the cloud computing system 150.

At block 203, process 200 involves modifying the compute capacity by providing the compute scaling adjustment to the cloud computing system, causing the cloud computing system to adjust a number of allocated compute instances. Cloud scaling application 122 can implement block 203 by generating an adjustment instruction and transmitting the adjustment instruction to the cloud computing system 150. The adjustment instruction can indicate, to the cloud computing system 150, an increase or decrease in the number of compute instances 170*a-n*. In one example, the adjustment instruction includes the compute scaling adjustment. In another example, the cloud scaling application 122 calculates a new compute capacity by adding the previous number of allocated compute instances (e.g., before any compute scaling adjustment) to the compute scaling adjustment calculated in block 203.

Blocks 201-203 of process 200 can be performed iteratively. For instance, the cloud scaling application 122 can be configured to execute blocks 203 on a periodic basis (e.g., every minute, every hour, etc.), in response to certain criteria (e.g., the queue 155 exceeding a certain size), or some combination thereof.

Figure 3:
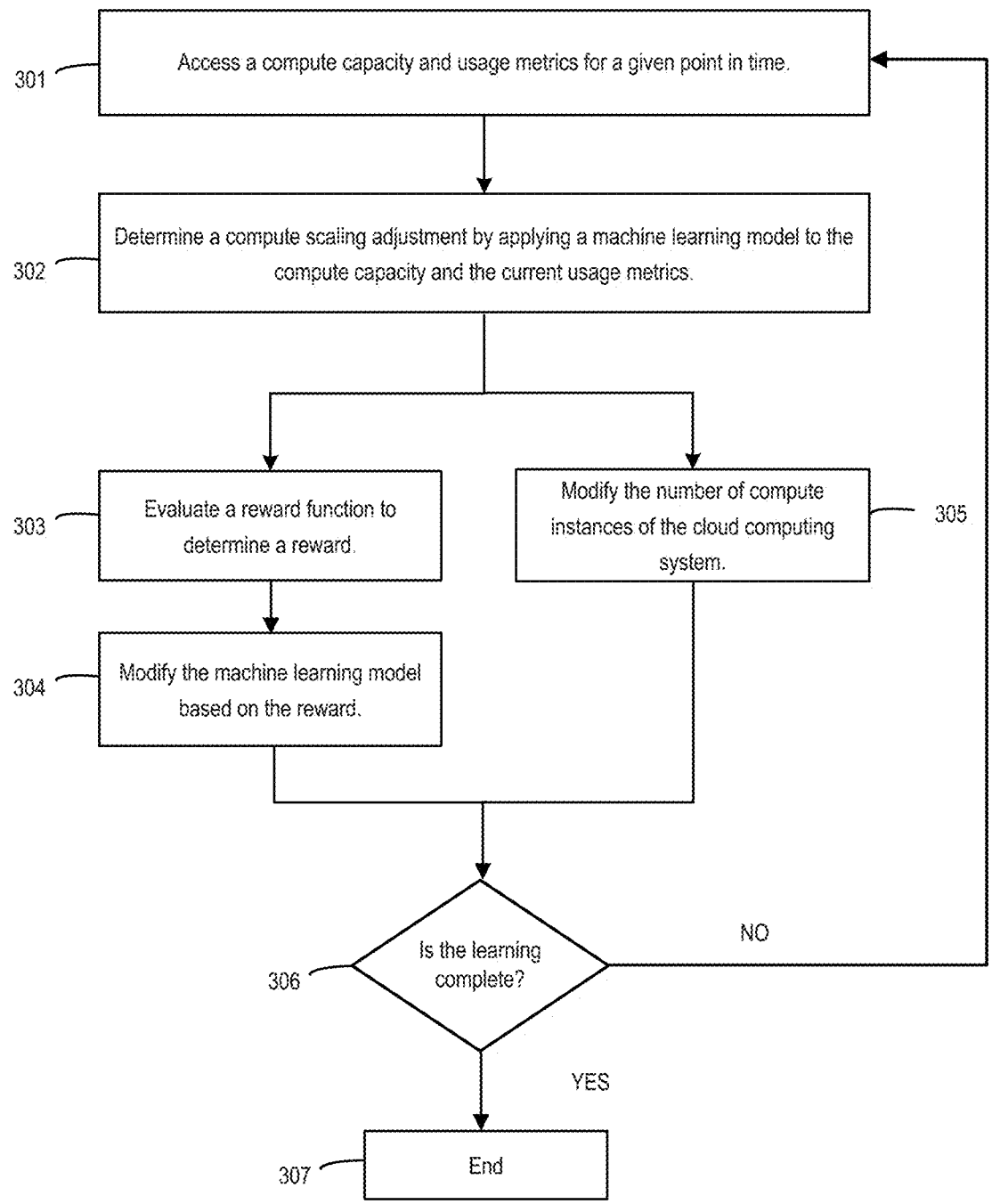
FIG. 3 is a flow chart depicting an example of a process for facilitating learning of a machine model to adjust a number of allocated compute instances of a cloud computing system, according to an embodiment of the present disclosure.

In some cases, the machine learning model completes a learning process prior to being deployed in the cloud computing system, for example via a simulation of a cloud computing environment using historical usage data. FIG. 3 depicts an example of one such process.

FIG. 3 is a flow chart depicting an example of a process for facilitating learning of a machine model to adjust a number of allocated compute instances of a cloud computing system, according to an embodiment of the present disclosure. As discussed, the machine learning model 124 can learn to adjust a compute capacity of cloud computing system 150 by using reinforcement learning. Process 300 describes an example of a process for performing reinforcement learning on the machine learning model. Process 300 can be performed within a simulated cloud computing environment or on cloud computing environment 100.

The simulated cloud computing environment simulates some or all of the components depicted in FIG. 1. For example, the simulated cloud computing environment includes a queue, tasks, and compute instances. In particular, the simulated cloud computing environment permits machine learning model 124 to use historical data that characterizes how a physical cloud computing environment executed tasks had a queue size of varying lengths and a number of compute instances that was adjusted over time. The simulated cloud computing environment can provide the compute capability and usage metrics to the machine learning model 124 such that the machine learning model 124 can attempt to make independent adjustments to a number of compute instances and a reward function can be evaluated based on those adjustments. Historical data can be obtained by monitoring tools like Splunk® or AWS Cloud-Watch.

At block 301, process 300 involves accessing a number of compute instances and usage metrics for a given point in time. The historical data can include compute capacity and usage metrics. In some cases, the data can also include data describing a new processing request that arrived at the point in time. Example data for the simulation includes sinusoidal load patterns, which can closely resemble day-to-night load pattern as found on typical cloud computing services, generated fixed load that changes after a given period, or production load patterns as obtained from a cloud monitoring service.

At block 302, process 300 involves determining a compute scaling adjustment by applying a machine learning model to the average utilization and the usage metrics. At block 302, process 300 involves similar operations as described with respect to block 202 of process 200.

At block 303, process 300 involves evaluating the reward function to determine a reward. The output of the machine learning model is used to evaluate the reward function (as described with respect to FIG. 4), and is provided back to the cloud computing environment to adjust the compute instances. For instance, cloud scaling application 122 implements block 303 by computing a reward value using a reward function 126 and modifying the machine learning model 124 in accordance with the reward value.

At block 304, process 300 involves modifying the machine learning model based on the reward. Cloud scaling application 122 provides the reward value to machine learning model 124. The reward function 126 is used to balance competing considerations with respect to the cloud computing system 150. For instance, the feedback provided by the reward function can be used by the cloud scaling application 122 to generate a compute scaling adjustment 133 that reduces the queue size to a desirable size without increasing a compute cost (as measured by a number of active compute instances) beyond a desirable level. For example, a desirable queue size might be 50 tasks in the queue, whereas an undesirable queue size may be 200.

In turn, cloud scaling application 122 can modify one or more internal parameters of the machine learning model 124 if the reward value indicates a less desirable performance of the adjusted cloud computing system 150. For instance, in embodiments involving a machine learning model 124 that is a neural network, block 303 can involve adding or removing one or more nodes from one or more hidden layers in the neural network, adding or removing one or more hidden layers in the neural network, etc. Additionally or alternatively, in embodiments involving a machine learning model 124 that is a tree-based machine learning model, block 303 can involve modifying the decision criteria within splitting rules. Modifying one or more internal parameters of the machine learning model 124 can cause a different compute scaling adjustment to be computed in respond to a subsequent processing request. The different compute scaling adjustment can result in an increased reward value being computed, thereby indicating an improvement in the ability of the machine learning model 124 to recommend adjustments to the cloud computing system 150.

At block 305, process 300 involves modifying the number of compute instances of the cloud computing system. The reward function 126 can compute a reward value from a set of terms representing the performance of the cloud computing system 150, as modified in accordance with the compute scaling adjustment. At block 305, process 300 involves similar operations as block 203 of process 200. Block 305 can occur in parallel with blocks 303-304.

Process 300 is iterative. For example, cloud scaling application 122 computes, with the reward function 126, a reward value. In a first iteration of the learning process, the cloud scaling application 122 receives a first reward value outputted by the reward function 126. The cloud scaling application 122 modifies one or more parameters of the machine learning model 124 to decrease the reward value in subsequent iterations. In a second iteration of the learning process, the cloud scaling application 122 receives a second reward value outputted by the reward function 126. A decrease in the reward value between these iterations may indicate that the machine learning model 124 is generating compute scaling adjustments that are undesirable (e.g., result in queues that are too large, numbers of compute instances 170a-n beyond the capabilities of the cloud scale system 120, etc.). If the second reward value is less than the first reward value, the cloud scaling application 122 may further modify one or more parameters of the machine learning model 124.

Additionally, by using reinforcement learning, certain embodiments are able to learn to balance short term and long term reward. For example, the machine learning model 124 can learn to accept a lower reward in the near term if obtaining a long term reward is more beneficial. For example, machine learning model 124 can learn that adding new compute instances 170a-n can cause negative rewards because of increased compute costs but also positive rewards in the longer term because the newly allocated compute instances become available and reduce the queue size.

At block 306, process 300 involves determining whether the learning is complete. For example, blocks 301-305 can be repeated until a sufficient amount of learning of the machine learning model 124 has been completed. Various approaches can be used to determine that the learning is complete. In some cases, when a specific number of iterations (e.g., 1000) is performed, then process 300 moves to block 307. In other cases, an error between the compute scaling adjustment calculated at block 302 relative to a benchmark or ideal compute scaling adjustment. When the error is below a threshold, then process 300 continues to block 307. Otherwise, if more learning is needed then, process 300 returns to block 301. At block 307, process 300 ends.

Figure 4:
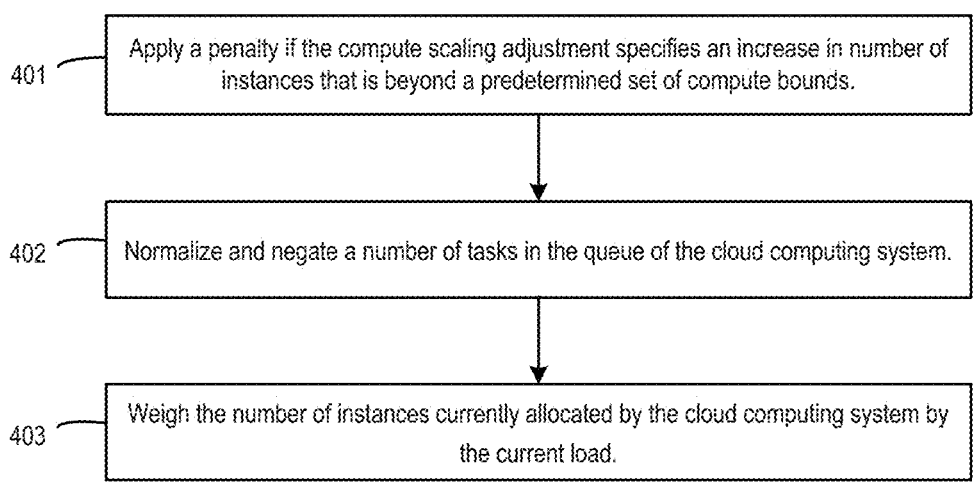
FIG. 4 is a flow chart depicting an example of a process for evaluating a reward function, according to an embodiment of the present disclosure.

FIG. 4 is a flow chart depicting an example of a process 400 for evaluating a reward function, according to an embodiment of the present disclosure. Process 400 can be performed by cloud scaling application 122. In this example, the reward function 126 can include a sum of three terms, where the first term represents any scaling of a number of compute instances 170a-n that is outside a predetermined set of compute bounds, the second term is a negative feedback component representing a number of tasks in the queue 155, and the third term represents a number of allocated compute instances 170a-n as compared to a current load. The current load is a proportion of the compute instances 170a-n that is being used any incoming processing requests and the tasks in the queue 155.

For example, the reward function can be expressed as:

$$R = -(e) + \left(-\frac{p}{1+p}\right) + -\left(\left(1 - \frac{\text{load}}{100}\right) * \left(\frac{\text{instances}}{\text{max instances}}\right)\right).$$

In this example of a reward function, the R term refers to the reward value, the e term refers to a penalty if the number of compute instances 170a-n is outside a predetermined set of compute bounds, the p term refers to a number of tasks in the queue, the load term refers to a current load, the instances term refers to a number of compute instances 170a-n that are allocated from the total compute instances 170a-n, and the max instances term refers to the total compute instances 170a-n. The terms of this reward function are described below with respect to blocks 401-404.

At block 401, process 400 involves applying a negative penalty (i.e., the e term in the reward function above) if the compute scaling adjustment 133 generated by machine learning model 124 specifies an increase or decrease in the number of compute instances 170a-n to a value that is outside a predetermined set of compute bounds. The value of e can be set to 0.1.

A set of compute bounds could be a maximum number of compute instances, such as the largest number of compute instances that may be instantiated using the processing and memory capabilities of the cloud computing system 150, and a minimum number of compute instances, such as a user-specified value. Scaling outside this set of compute bounds could involve causing the allocated number of compute instances to be greater than a maximum or lower than a minimum. The allocated number of compute instances is determined by adding the previous number of allocated compute instances (e.g., before any compute scaling adjustment) to the compute scaling adjustment (which may be negative if compute instances are to be reduced).

Applying this negative penalty can decrease the reward value computed by the reward function 126. This decrease in the reward function can indicate that a determined compute scaling adjustment 133 results in a number of compute instances that is below the minimum or above the maximum number of compute instances. Thus, including the negative penalty in the reward function can reduce the likelihood that the machine learning model 124 suggests a compute scaling adjustment that would exceed the capabilities of the cloud computing system 150 or would cause the number of compute instances 170a-n to be below a minimum value. Examples of a minimum value are an absolute minimum, e.g., zero, and a threshold minimum number of compute instances 170a-n that is a known to be required to provide acceptable minimum performance.

At block 402, process 400 involves normalizing and negating a number of tasks (i.e., the p term in the reward function above) in the queue of the cloud computing system. Increasing the number of a number of tasks in the queue 155 can decrease a reward value computed by the reward function 126, which can in turn result in the compute scaling adjustment 133 having a value that causes the cloud computing system 150 to increase the number of the compute instances 170a-n. This number is negated (i.e., multiplied by −1) in the reward function to represent the fact that a higher number of tasks is undesirable.

For instance, the cloud scaling application 122 obtains from the cloud computing system 150, usage metrics 132 that include the number of tasks in the queue 155. The cloud scaling application 122 normalizes the number of tasks by using an inverse odds ratio function $$\frac{p}{1+p},$$

where p is a number of tasks in the queue. This normalization maps a large (theoretically infinite) queue size value to the range of 0 to 1. The cloud scaling application 122 negates the normalized number of tasks by multiplying the normalized number of tasks by −1. Thus, the negative feedback component is provided by $$-\frac{p}{1+p}.$$

Figure 5:
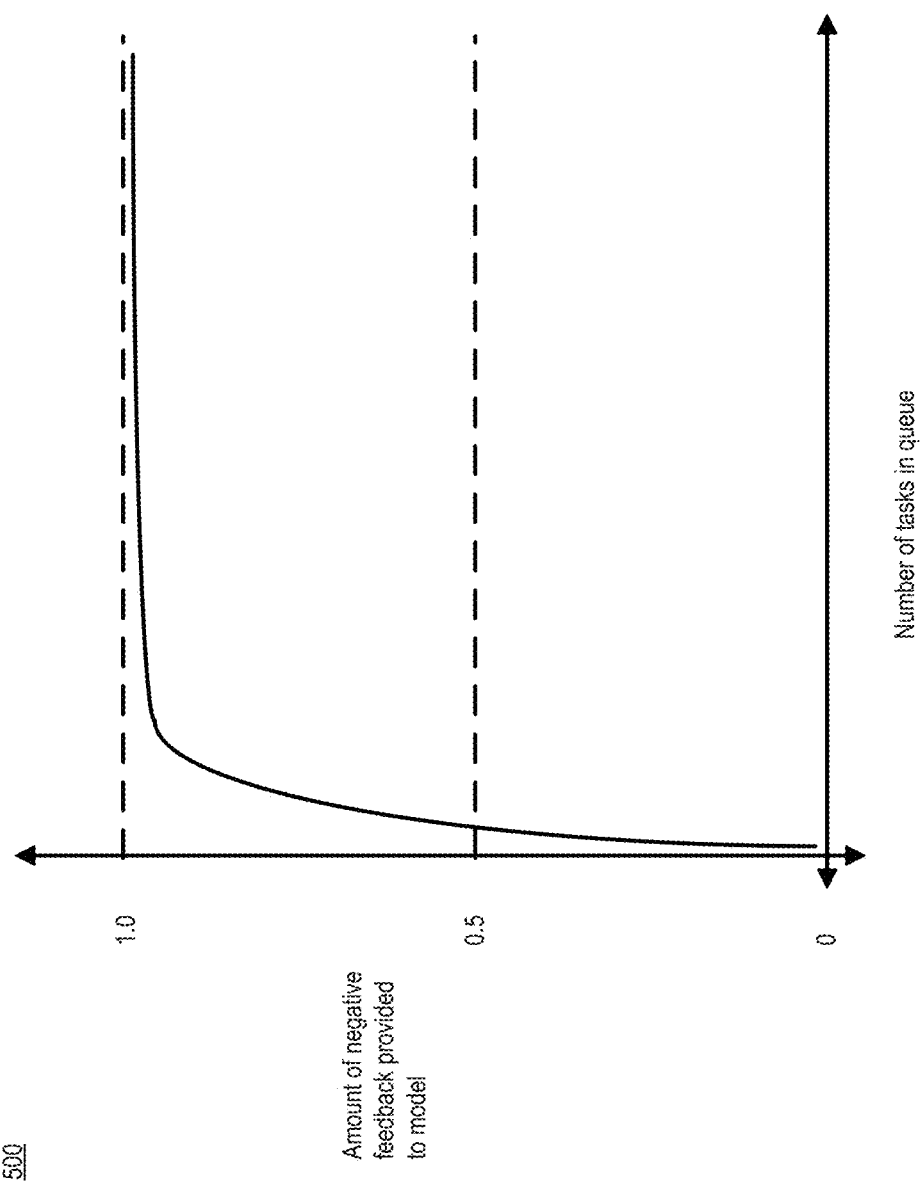
FIG. 5 is a graph depicting an example of a negative feedback component of a reward function used to calculate a reward, according to an embodiment of the present disclosure.

An example of a set of values for this negative feedback component is depicted in the graph 500 of FIG. 5. The graph 500 depicts an amount of negative feedback, or penalty, provided to the model as a function of the number of tasks in the queue. As can be seen, an increase in number of tasks in the queue sharply increases the negative feedback. The increase in the negative feedback helps the model learn to avoid leaving too many tasks in the queue because the model is penalized with lower reward when it permits the number of tasks in the queue to grow.

Returning to FIG. 4, at block 403, process 400 involves weighting the number of compute instances (i.e., the instances term in the reward function above) by the current load (i.e., the load term in the reward function above). The number of the compute instances 170a-n, which could be included in or derived from the compute capacity 131, as compared to a current load can indicate whether a current number of the compute instances 170a-n is sufficient to process the current load. As a simplified example, five of ten available compute instances may be assigned, but the load is 95%. In this case, the five compute instances may not be able to handle load spikes in a timely manner. Increasing the value the "instances" term in the reward function 126 can increase a reward value computed by the reward function 126, which can in turn result in the compute scaling adjustment 133 having a value that causes the cloud computing system 150 to increase the number of the compute instances 170a-n.

To implement block 403, cloud scaling application 122 weights the number of compute instances by the current load. The current load is the proportion of the current number of compute instances that is being used by the incoming load plus the queue size. An example of the weighting performed at block 403 is:

$$\text{weighting} = -1 * \left(1 - \frac{\text{load}}{100}\right) * \left(\frac{\text{instances}}{\text{max instances}}\right).$$

As discussed above, the load term refers to a current load, the instances term refers to a number of compute instances 170a-n that are allocated from the total compute instances 170a-n, the max instances term refers to the total compute instances 170a-n.

In general, the model attempts to ensure that sufficient compute capacity is available, but also attempts to minimize the number of additional compute instances that are allocated. The weighting indicates to the machine learning model that scaling down during times of high computing load is less desirable than during times of low computing loads. This weight avoids the model getting contradictory components of the reward function, rendering the model unable to balance queue size against cost. In an example, by maximizing cumulative reward rather than a reward for a current iteration, the model learns that while adding a compute instance might incur a small immediate penalty, the additional compute instance will provide additional reward in the long term by helping avoid a penalty for incurring a longer queue size.

The sum of the three components of the reward function (as calculated by blocks 401-403 respectively) are normalized between zero and one to keep them in balance and give the model feedback on all three areas. Once the reward value is calculated, it is provided to the machine learning model 124.

Figure 6:
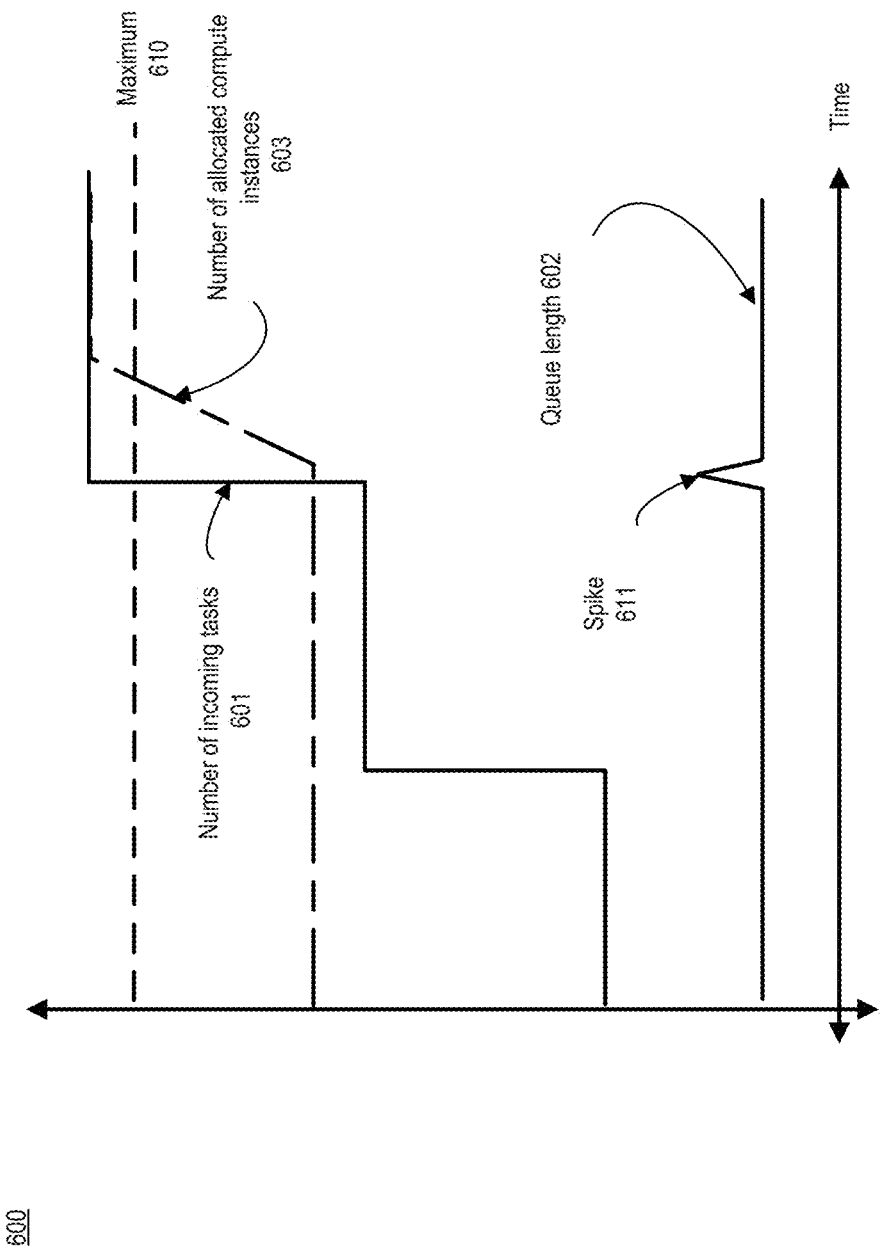
FIG. 6 is a graph depicting results of a simulation of cloud computing capacity adjustments, according to an embodiment of the present disclosure.
Figure 7:
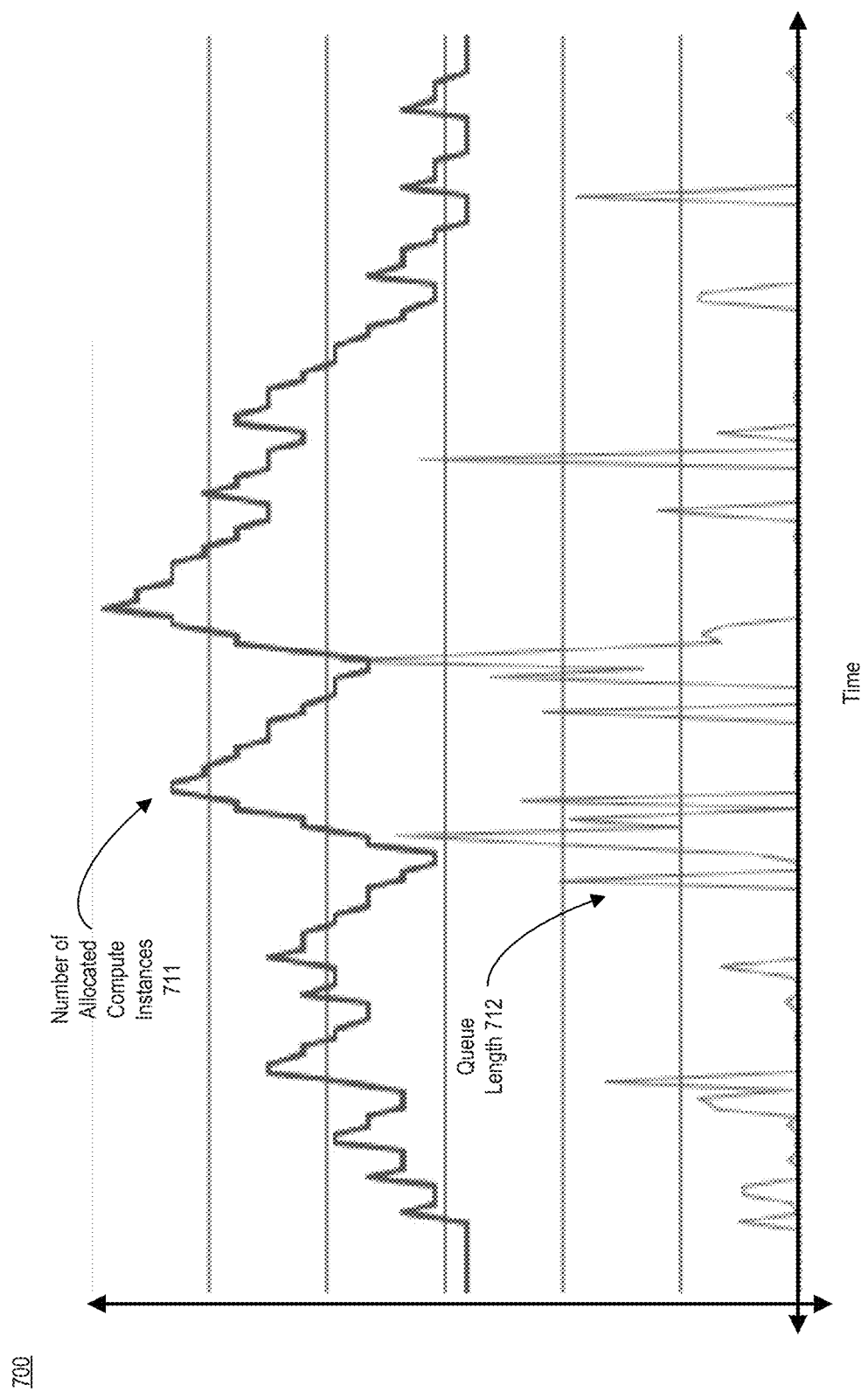
FIG. 7 is a graph depicting additional results of a simulation of cloud computing capacity adjustments, according to an embodiment of the present disclosure.

FIGS. 6-7 describe examples of simulations performed to facilitate learning of a machine learning model. FIG. 6 is a graph 600 depicting results of a simulation of cloud computing capacity adjustments. The graph 600 identifies a number of incoming tasks 601, queue length 602, and a number of allocated compute instances 603, each of which vary over time. Graph 600 can represent a simulation, e.g., a process by which a machine learning model learns to calculate a compute scaling adjustment. Graph 600 can also represent a learning process that takes place at runtime (e.g., relating to a physical cloud computing system).

The number of incoming tasks 601 can also refer to a number of incoming processing requests. As can be seen, the queue length 602 is constant, except for spike 611, which is caused by a number of incoming tasks 601 increasing. These tasks are not immediately processed, causing spike 611. As can be seen, subsequent to the queue length 602 increasing at spike 611, cloud scaling system 120 increases the number of compute instances 603 to compensate for the spike 611. Increasing the number of compute instances 603 causes the queue length 602 to decrease back to a previous level. However, the machine learning model has increased the number of compute instances over the maximum 610. The reward function can take this into consideration and cause the model not to increase the number of compute instances beyond this maximum 610.

FIG. 7 is a graph depicting additional results of a simulation of cloud computing capacity adjustments, according to an embodiment of the present disclosure. FIG. 7 depicts graph 700, which shows a number of compute instances 711 and queue length 712. As can be seen, the cloud scaling system 120 is able to react to an increase in queue length and increase the number of compute instances. Conversely, the cloud scaling system 120 can decrease the number of compute instances when more are allocated than are needed.

Figure 8:
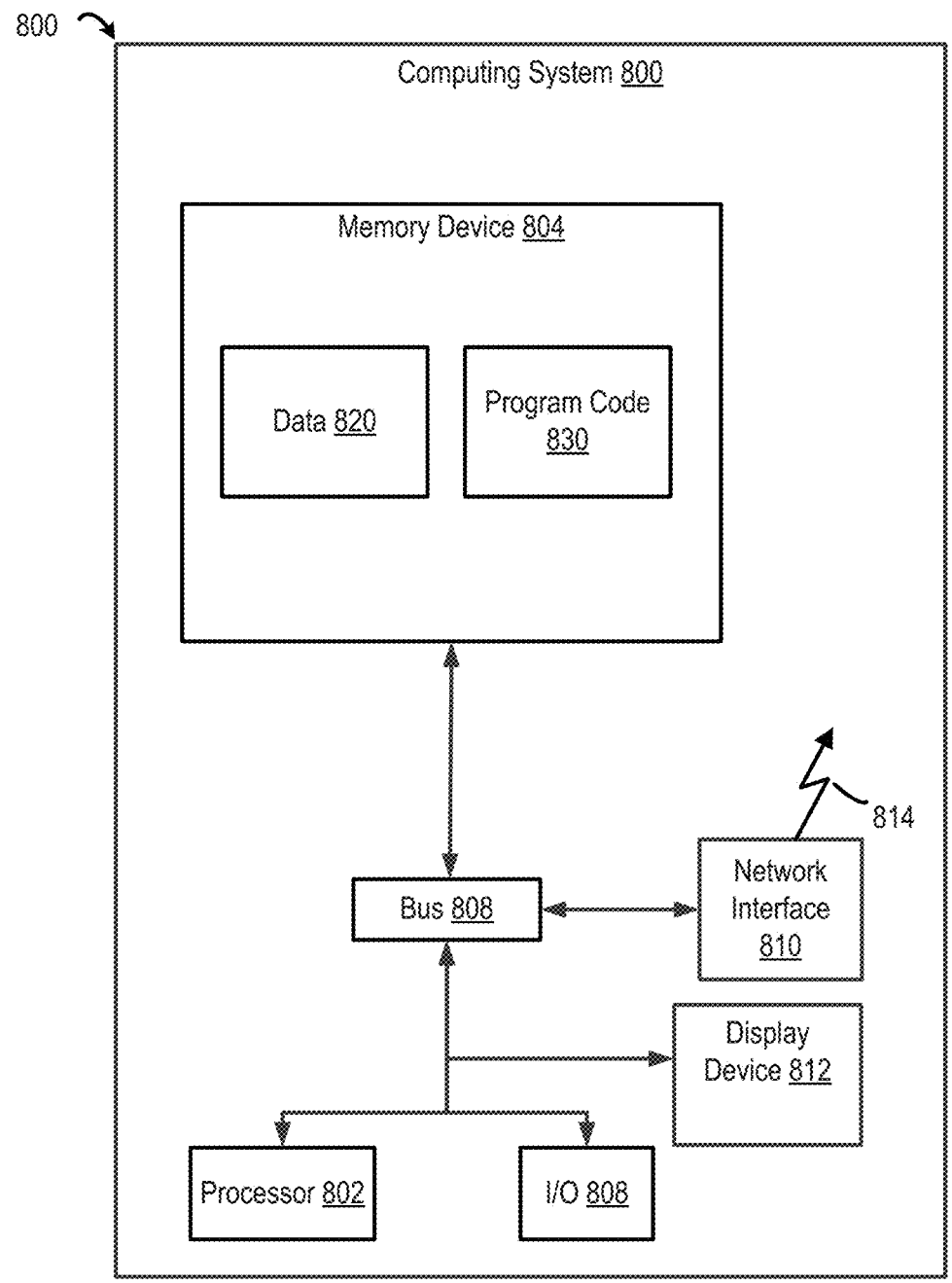
FIG. 8 is a diagram depicting an example of a computing system for implementing certain embodiments of the present disclosure.

FIG. 8 is a diagram depicting an example of a computing system for implementing certain embodiments of the present disclosure. FIG. 8 depicts computing device 800, which is an example of cloud scaling system 120, cloud computing system 150, or client computing device 110, and can execute cloud scaling application 122. Any suitable computing system may be used for performing the operations described herein. The depicted example of a computing device 800 includes a processor 802 communicatively coupled to one or more memory devices 804. The processor 802 executes computer-executable program code 830 stored in a memory device 804, accesses data 820 stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices or cores, including a single processing device. The functionality of the computing device may be implemented in hardware, software, firmware, or a combination thereof.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language.

The computing device 800 may also include a number of external or internal devices, such as input or output devices. For example, the computing device 800 is shown with one or more input/output ("I/O") interfaces 808. An I/O interface 808 can receive input from input devices or provide output to output devices. One or more busses 808 are also included in the computing device 800. The bus 808 communicatively couples one or more components of a respective one of the computing device 800.

The computing device 800 executes program code 830 that configures the processor 802 to perform one or more of the operations described herein. For example, the program code 830 causes the processor to perform the operations described in FIGS. 1-4.

The computing device 800 also includes a network interface device 810. The network interface device 810 includes any device or group of devices suitable for establishing a wired or wireless data connection to one or more data networks. The network interface device 810 may be a wireless device and have an antenna 814. The computing device 800 can communicate with one or more other computing devices implementing the computing device or other functionality via a data network using the network interface device 810.

The computing device 800 can also include a display device 812. Display device 812 can be a LCD, LED, touch-screen or other device operable to display information about the computing device 800. For example, information could include an operational status of the computing device, network status, etc.

General Considerations

Numerous specific details are set forth herein to provide a thorough understanding of the claimed subject matter. However, those skilled in the art will understand that the claimed subject matter may be practiced without these specific details. In other objects, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

What is claimed is:

1. A cloud scaling system comprising: one or more processing devices; and
    a non-transitory computer-readable medium communicatively coupled to the one or more processing devices, wherein the one or more processing devices are configured to execute instructions and thereby perform operations comprising:
    accessing, from a cloud computing system, (a) a compute capacity indicating a number of allocated compute instances of the cloud computing system and (b) usage metrics indicating pending task requests in a queue of the cloud computing system;
    determining, for the cloud computing system, a compute scaling adjustment by applying a machine learning model to (a) the compute capacity of the cloud computing system and (b) the usage metrics, wherein:
        the compute scaling adjustment indicates an adjustment to a number of compute instances of the cloud computing system; and
        the machine learning model is trained using reinforcement learning and a reward function that is a function of a number of requests in the queue and the number of allocated compute instances and comprises one or more of (a) an overage of the number of compute instances relative to a maximum number of compute instances, (b) a number of pending processing requests in the queue, or (c) a weighted sum of the number of compute instances relative to a current load, wherein the current load is a proportion of a current number of compute instances that is used by tasks in the queue;
    computing a reward value by evaluating the reward function;
    providing the reward value to the machine learning model, wherein the machine learning model adjusts one or more internal parameters to maximize a cumulative reward; and
    responsive to determining that the cumulative reward is above a threshold, providing the compute scaling adjustment to the cloud computing system, wherein the cloud computing system adjusts the number of allocated compute instances.

2. The cloud scaling system of claim 1, wherein the operations further comprise receiving, from a client computing device, a processing request, forwarding the processing request to the cloud computing system, and wherein the accessing further comprises applying the machine learning model to the processing request.

3. The cloud scaling system of claim 2, wherein the operations further comprise causing the cloud computing system to remove the processing request from the queue and execute the processing request.

4. The cloud scaling system of claim 1, wherein adjusting the number of compute instances comprises allocating one or more hardware devices to the cloud scaling system or removing the one or more hardware devices from the cloud computing system.

5. A method of facilitating learning of a machine learning model, the method comprising:
    accessing historical data comprising, for a point in time:
    (a) a compute capacity; and
    (b) usage metrics indicating pending processing requests in a queue and a current utilization of available compute instances;
    determining a compute scaling adjustment for a cloud computing model by applying a machine learning model to (a) the compute capacity indicating a number of allocated compute instances and (b) the usage metrics, the compute scaling adjustment indicating an adjustment to a number of compute instances;
    modifying the number of compute instances of the cloud computing model according to the compute scaling adjustment;
    computing a reward value as a function of (a) an overage of the modified number of compute instances relative to a maximum number of compute instances, (b) a number of pending processing requests in the queue, or (c) a weighted sum of the modified number of compute instances relative to a load, wherein the load is a proportion of a current number of compute instances that is used by tasks in the queue;
    providing the reward value to the machine learning model, wherein the machine learning model adjusts one or more internal parameters to maximize a cumulative reward; and
    responsive to determining that the cumulative reward is above a threshold, providing the machine learning model to a cloud compute scaling system, wherein the cloud compute scaling system causes the cloud computing system to use the machine learning model to determine an additional compute scaling adjustment and applies the additional compute scaling adjustment to adjust the number of one or more compute instances on a cloud computing system.

6. The method of claim 5, wherein the historical data is derived from the cloud computing system, the cloud computing system having executed one or more processing requests.

7. The method of claim 5, wherein the historical data comprises a new processing request arriving at the point in time and wherein determining the compute scaling adjustment comprises applying the machine learning model to the new processing request, the method further comprising inserting the new processing request into the queue of the cloud computing model.

8. The method of claim 5, further comprising:
    providing the compute scaling adjustment to a cloud computing system; and causing the cloud computing system to execute additional processing requests.

9. The method of claim 5, wherein computing the reward value further comprises normalizing and negating number of processing requests in the queue.

10. The method of claim 5, wherein computing the reward value further comprises normalizing and negating the number of compute instances.

11. A non-transitory computer-readable storage medium storing non transitory computer-executable program instructions, wherein when executed by a processing device, the computer-executable program instructions cause the processing device to perform operations comprising:
- determining, for a cloud computing system having a number of compute instances, a compute scaling adjustment by applying a machine learning model to (a) a compute capacity indicating a number of allocated compute instances of the cloud computing system and (b) usage metrics indicating pending any processing requests in a queue of the cloud computing system, wherein the compute scaling adjustment indicates an adjustment to the number of compute instances wherein the machine learning model uses reinforcement learning;
- computing a reward value by evaluating a reward function that is a function of a number of requests in the queue and a number of allocated compute instances and comprises one or more of; (a) an overage of the number of compute instances relative to a maximum number of compute instances, (b) a number of pending processing requests in the queue, or (c) a weighted sum of the number of compute instances relative to a current load, wherein the current load is a proportion of a current number of compute instances that is used by tasks in the queue; and
- adjusting an internal parameter of the machine learning model based on the reward value; and
- responsive to determining that the reward value is above a threshold for the compute scaling adjustment, providing the compute scaling adjustment to the cloud computing system, wherein the cloud computing system allocates or deallocates or more compute instances.

12. The non-transitory computer-readable storage medium of claim 11, wherein the operations further comprise:
- receiving, from a client computing device, a processing request; and forwarding the processing request to the cloud computing system, wherein the cloud computing system inserts the processing request into the queue.

13. The non-transitory computer-readable storage medium of claim 12, wherein the operations further comprise causing the cloud computing system to remove the processing request from the queue and execute the processing request.

14. The non-transitory computer-readable storage medium of claim 11, wherein computing the first reward value comprises evaluating a function of an overage of the compute scaling adjustment relative to the compute capacity.

15. The non-transitory computer-readable storage medium of claim 11, wherein computing the first reward value comprises evaluating a function of a number of requests in the queue.

16. The non-transitory computer-readable storage medium of claim 11, wherein computing the first reward value comprises evaluating a function of a number of compute instances.

* * * * *